United States Patent
Kazemifar et al.

(10) Patent No.: US 9,311,572 B2
(45) Date of Patent: Apr. 12, 2016

(54) CARD HOLDING DEVICE

(71) Applicants: Omid Kazemifar, Staffanstorp (SE); Peter Sendelius, Staffanstorp (SE); Daniel Skagmo, Malmö (SE); Martin Wolff, Lund (SE)

(72) Inventors: Omid Kazemifar, Staffanstorp (SE); Peter Sendelius, Staffanstorp (SE); Daniel Skagmo, Malmö (SE); Martin Wolff, Lund (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 164 days.

(21) Appl. No.: 13/912,497

(22) Filed: Jun. 7, 2013

(65) Prior Publication Data
US 2013/0327837 A1    Dec. 12, 2013

Related U.S. Application Data

(60) Provisional application No. 61/657,249, filed on Jun. 8, 2012.

(51) Int. Cl.
| | | |
|---|---|---|
| *G06K 13/00* | (2006.01) | |
| *G06K 13/14* | (2006.01) | |
| *H04B 1/3816* | (2015.01) | |
| *G06K 7/00* | (2006.01) | |
| *G06K 13/08* | (2006.01) | |

(52) U.S. Cl.
CPC ............. *G06K 13/14* (2013.01); *G06K 7/003* (2013.01); *G06K 13/085* (2013.01); *H04B 1/3816* (2013.01)

(58) Field of Classification Search
CPC .............. G06K 19/06037; G06K 19/06112; G06K 7/1465; G06K 13/085; G06K 7/003; H04B 1/3816
USPC ....................................................... 235/482
See application file for complete search history.

(56) References Cited

U.S. PATENT DOCUMENTS

| | | |
|---|---|---|
| 5,224,873 A | 7/1993 | Duffet et al. |
| 6,557,761 B1 | 5/2003 | Oya et al. |
| 7,217,148 B1 * | 5/2007 | Chen ............................ 439/326 |
| 2003/0022537 A1 | 1/2003 | Bricaud et al. |
| 2003/0049968 A1 | 3/2003 | Nogami |

FOREIGN PATENT DOCUMENTS

| | | |
|---|---|---|
| EP | 1857959 | 11/2007 |
| WO | 9813784 | 4/1998 |

* cited by examiner

*Primary Examiner* — Christle I Marshall
*Assistant Examiner* — Asifa Habib
(74) *Attorney, Agent, or Firm* — Tucker Ellis LLP (57) ABSTRACT

A portable electronic device comprises a card holding device and a card reader for introducing and removing a card into and from the card reader in at least two different directions being angled in relation to each other during introduction and removal of the card.

22 Claims, 8 Drawing Sheets

CARD HOLDING DEVICE

RELATED APPLICATIONS

This application claims priority under 35 U.S.C. §119 based on U.S. Provisional Patent Application No. 61/657,249, filed Jun. 8, 2012, and European Patent Application No 12171340.8, filed Jun. 8, 2012, the disclosures of which are both hereby incorporated by reference herein.

TECHNICAL FIELD OF THE INVENTION

The present invention relates to a card connecting and holding device for facilitating removing/ejecting and/or introducing memory cards used in card readers, such as smart cards. The memory card holding and connecting device may advantageously be used in an electronic device having such a card reader.

DESCRIPTION OF RELATED ART

Today, there exist various ways of facilitating the introduction and removal, e.g., by ejection of external cards with memories used in portable electronic devices. Moreover, there exist different types of smart cards with differing sizes for different portable electronic devices, such as mobile telephones, smart phones, lap tops, tablets/media plates (e.g. iPad®), communicators, cameras, digital audio players (e.g. MP3-players or iPods®), electronic photo frames, cable and satellite set up boxes etc. The smart cards may be different types of memory or smart cards, e.g., removable SIM cards with or without holes or recesses and/or bevels/chamfers and removable flash memory cards with different shapes, e.g., with protrusions, and/or non-symmetric shapes with cuts, cut-in portions, recesses, notches, cavities, indentations in any number and combinations, e.g., SD™, microSD™, microSDHC™, M2 and Compact flash. However, most smart cards are flat, thin and square or rectangular plates and may be designed as an external removable and small card that is removed/ejected from or introduced into the electronic device by a controlled and biased eject/introduction function in a card holder or reader. Such actuation for introducing or ejecting a smart card is known using push-push or push-pull ejectors, and will not be explained in more detail.

There is also known ways of introducing into or ejecting smart cards from card readers manually by using a larger area around the card reader, i.e., in these known ways of introducing/ejecting smart cards into/from card readers the available area around, i.e. outside or externally of the actual footprint area of the card reader must be at least as large as the area of the smartcard to be able to introduce or eject it from the card reader as this is often done from a side of the card reader in the same plane as the card reader or at least in parallel with the plane of the card reader. This increases the necessary footprint area around the card reader at least doubling the area of and around the card reader that is required physically to accommodate the space/clearance around the card reader so that the smart card may be moved in and out of the card reader without great effort. Moreover, the housing of the portable electronic device may also have to be designed in a more complex way for enabling and accommodating both the manual handling and the unnecessary large foot-print area of the card reader, e.g., due to large openings in the housing and/or more complicated means/devices, e.g., with movable parts, allowing opening and closing of the housing, e.g., by means of openable/closable lids with varying complexity in sealings around the lids or similar means, for access of the card reader when introducing a smart card therein or removing a smart card therefrom.

Card readers are equipped with terminals in the form of contacts for electrical connection to the smart card to enable reading of the smart card. The contacts may be formed as contact legs being shaped or bent at a free end for achieving a biasing and flexible effect when the card is introduced in the card reader such that a reliable connection is accomplished by the card passing over the contact leg and pressing the contact leg into connection/contact with the contacts of the card. Each contact leg enables data in the card to be transferred to or from the electronic device easily. Known contact legs are often curved and extend in a plane being perpendicular to the plane of the card reader.

Different smart cards for the usage together with portable electronic devices, may have at least one unevenness, e.g., a dent with edges that may hook into edges of a card reader, and some cards even have holes, e.g., through holes, for different reasons. This may give rise to problems for a user when introducing or removing a smart card, since any unevenness or hole may hook or get caught/jammed at the free end of the contact leg, whereby the contact leg is deformed and even destroyed so that it becomes inoperable. One way of trying to solve this problem is to elongate the length of the free end or to orientate/place each contact leg such that there is a lesser risk of hooking thereon, but this may not be possible in low profile card readers as the available space, i.e., height is limited. Hence, an extended free end would hit the bottom of the card reader before the contact leg is fully deflected, whereby the smart card would not fit inside the card reader or the contact leg would be deformed to an undesired extent.

Consequently, there are currently many different smart cards for the usage together with portable electronic devices, and some cards are smaller and differently shaped than others. This may give rise to problems for a user, since the smaller a smart card, a card reader or an electronic device equipped with these means the more difficult to introduce into and remove smart cards from card readers. Known card readers without push-push or push-pull ejectors involve an increased cost for the manufacturer of the portable electronic device as a certain additional area and volume of the device in general is dedicated for accommodating the clearance around the card reader necessary for this making the electronic device larger than necessary. When a portable electronic device is equipped with card readers comprising movable parts, these card readers are complicated and not that robust, increasing the risk of breakage of the movable parts.

Hence, there is a need of reliable, simple and quick ways of introducing into and/or withdrawing smart cards from a card reader that optimizes/minimizes the foot-print area of and around the card reader. This is also due to the fact that the size of the card readers, i.e., at least their height in z-axis, must be as small as possible as the sizes and/or heights and/or thicknesses of portable electronic devices decreases constantly, whereby the available height for contact legs inside the card reader decreases and also allows only a certain minimum height available for clearance and/or room for the thickness and movement of a smart card and the associated card reader itself. The length of the protruding free end for known contact legs also involves an increased cost for the manufacturer of the portable electronic device as a certain additional volume of the device in general is dedicated for accommodating the height of the bent contact leg. Moreover, any jamming of the smart card in the card reader may urge the user to use too much force when trying to introduce or withdraw the card, whereby the contact legs, the card and/or the card reader may be damaged. Yet further, when a portable electronic device is to be equipped with a card reader, the handling and size of the portable electronic device are compromised as known contact legs, due to their shape, require a certain minimum height and foot-print area inside the card reader.

SUMMARY OF THE INVENTION

It has therefore, with the above and the following description in mind, and in view of an aspect of the present invention to provide an improved device, which seeks to mitigate, alleviate or eliminate one or more of the above-identified deficiencies in the art and disadvantages singly or in any combination.

The present invention is defined by the appended independent claims. Various advantageous aspects/embodiments of the invention are set forth by the appended dependent claims as well as by the following description and the accompanying drawings.

An aspect of the present invention relates to a portable electronic device comprising a card holding device and a card reader for introducing and removing a card into and from the card reader in at least two different directions, wherein the card is moved in one direction being angled in relation to the plane of the card reader and moved laterally in another direction in the card reader during introduction and removal of the card, which card holding device comprises only non-movable parts.

An aspect of the present invention relates to a portable electronic device, wherein the card holding device comprises a first card holding part and a second card holding part, wherein, during introduction and removal of the card, the card is moved in the angled direction and the lateral direction, respectively, past and/or under the first and second parts of the card holding device.

An aspect of the present invention relates to a portable electronic device, wherein the card holding device comprises a first card holding part and a second card holding part, which card holding device has at least two edges, a first edge at the first card holding part and a second edge at the second card holding part, wherein, during introduction and removal of the card, the card is moved in the angled direction and the lateral direction, respectively, past and/or under the edges of the card holding device.

Another aspect relates to a portable electronic device, wherein, during introduction and removal of the card, the card is adapted to be moved in the angled direction above the first part and below the second part of the card holding device.

An aspect relates to a portable electronic device, wherein, during introduction and removal of the card, the card is adapted to be moved in the lateral direction under the first part and the second part of the card holding device.

Another aspect relates to a portable electronic device, wherein, during introduction and removal of the card, the card is adapted to be moved in the angled direction above the first edge and below the second edge of the card holding device.

An aspect relates to a portable electronic device, wherein, during introduction and removal of the card, the card is adapted to be moved in the lateral direction under the first edge and the second edge of the card holding device.

An aspect relates to a portable electronic device, wherein, the card holding device is fenestrated enabling the card to be introduced and removed in the vertical direction/z-axis of the card reader through an opening between the card holding parts, which opening is arranged within the footprint area of the card reader.

Another aspect relates to a portable electronic device, wherein, the card holding device comprises a protrusion arranged at the second card holding part opposite the second edge of the second card holding part.

An aspect relates to a portable electronic device, wherein the protrusion faces the plane of the card reader and holds the card in place laterally in the introduced state.

Another aspect relates to a portable electronic device, wherein, the card reader comprises spring terminals, which spring terminals operatively connects the card to the card reader for reading while biasing the card from the card reader into locking engagement with the card holding device in the introduced state of the card.

An aspect relates to a portable electronic device, wherein, the card holding device comprises a wedge achieving a keying feature for preventing misinsertion of the card, which wedge comprises a detection switch for detecting introduction and removal of the card.

An aspect relates to a portable electronic device, wherein a card holding device is intended for the usage together with the portable electronic device, wherein the portable electronic device is a device from the group comprising: a mobile radio terminal, a mobile telephone, a cellular telephone, a pager, a communicator, a smart phone, a tablet/media plate, a Personal Digital Assistant (PDA), an electronic organizer, a computer, a digital audio player or a digital camera.

Thus, the portable electronic device according to the invention comprises an integrated card holding device that serves as a smart and robust built-in-device in a card reader, which card holding device has no movable parts. The card holding device is fixed to the card reader and able to facilitate the removal of the smart card from the card holder or reader. The card holding device may also facilitate the introduction of the smart card into the card reader. It is an advantage with the invention that no movable parts are necessary for operating the card holding device, whereby there are fewer items that may break during removal and/or introduction of the smart card and be manufactured, kept track of, be stored and handled during manufacture of the card holding device and the card reader. Thus, also the total cost for manufacturing the electronic device using such a card holding device may be reduced. Furthermore, by being able to insert and remove the smart card from the card reader in the vertical direction, i.e., along a z-axis if the card reader defines an x-y-plane, through an opening between the card holding parts and their edges. This opening enables receiving and removing the smart card from the card reader by facing or "opening up" in the vertical direction of the card reader, i.e. in the normal direction of the plane of the card reader. This opening of the card reader makes the card reader fenestrated. This smart card access opening of the card reader is arranged within the footprint area of the card reader, the external space and/or area outside/ around the card reader required for insertion and removal of the smart card is/are optimized, and even minimized, reducing the corresponding total footprint area (including the card reader itself) being reserved/necessary for this handling of the smart card. Furthermore, the detection switch being integrated in a chamfer area of the card reader prevents misinsertion of the smart card, i.e. a keying feature/function for the card is achieved. Moreover, the detection switch being integrated in the chamfer area of the card holding device and card reader saves space as the chamfer area is already existing occupying a certain volume inside the card reader, whereby no additional space is required for accommodating the detection switch. Furthermore, any openings and lids in the housing of the portable electronic device giving access to the card reader may be made smaller and are also easier to seal off against the surroundings due to the invention.

BRIEF DESCRIPTION OF THE DRAWINGS

Further aspects, features and advantages of the invention will appear from the following detailed description of the invention, wherein the invention will be described in more detail with reference to the accompanying drawings, in which.

DETAILED DESCRIPTION OF EMBODIMENTS

Figure 16:
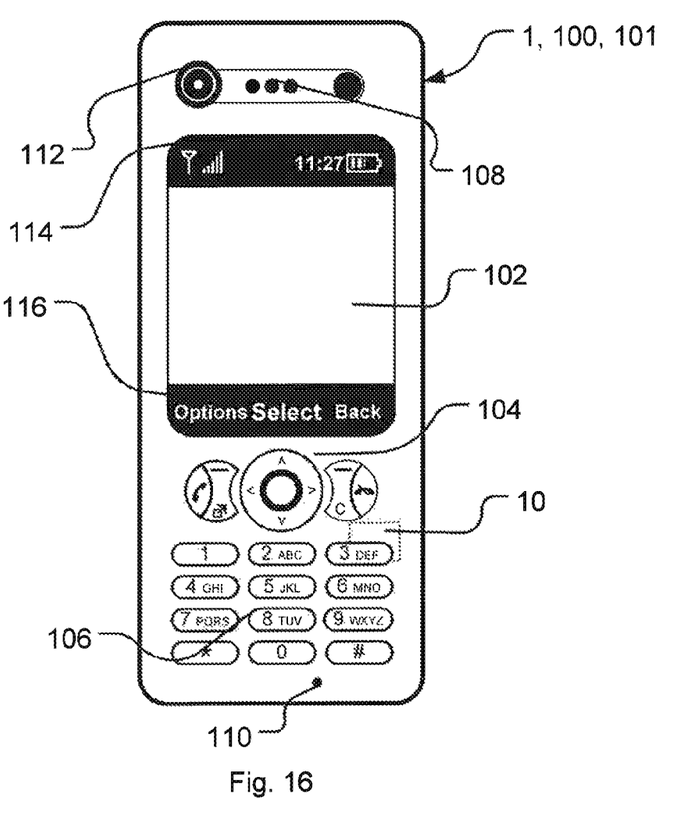
FIG. 16 shows a mobile/portable electronic device and an outline of an example where the card holding device can be positioned.

Aspects of the present invention will be described more fully hereinafter with reference to the accompanying drawings. FIGS. 1-15 show different views of a part of a portable electronic device 1 comprising a card holding device 10 according to different aspects of the invention. FIG. 16 shows a mobile electronic device 1, 100 where an exemplifying position of the card holding device 10 is outlined. This invention may, however, be embodied in many different forms and should not be construed as limited to the examples set forth herein. Rather, these examples are provided so that this disclosure will be thorough and complete, and will fully convey the scope of the invention to those skilled in the art. Like numbers refer to like elements throughout.

FIG. 16 shows a portable electronic/communication device 100, according to an embodiment of the present invention, comprising a casing 101, a display area 102 and means 104 for navigating among items (not shown) displayed in the display area. The display area 102 may comprise a status indication area 114 and one or more softkey bars 116. The status indication area 114 may for example include symbols for indicating battery status, reception quality, speaker on/off, present mode, time and date, etc. The status indication section is not in any way limited to include the symbols and the functions presented herein. The softkey bar 116 is operable using the navigation means 104 or, if using a touch sensitive screen, by tapping the softkey directly with a pen-like object, a finger, or other body part. The functions of the softkeys are not limited by the functions indicated in the figure. Neither are the placements of the softkey bar 116 and the status indication area 114 limited to be placed at the bottom and the top of the screen, as shown in the example. The navigation means 104 can be a set of buttons, a rotating input, a joystick, a touch pad, a multidirectional button, but can also be implemented using a touch sensitive display, wherein the displayed items directly can be tapped by a user for selection, or be voice activated via a headset or a built-in microphone. The mobile communication device 100 can also comprise other elements normally present in such a device, such as a keypad 106, a speaker 108, a microphone 110, a camera 112, a processor (not shown), a memory (not shown), one or more accelerometers (not shown), a vibration device (not shown), an AM/FM radio transmitter and receiver (not shown), a digital audio broadcast transmitter and receiver (not shown), and the inventive card reader 10, etc.

The card holding device 10 according to the portable electronic device 1 of the disclosed invention is preferably, but not necessarily, intended for the usage together with a portable electronic device 1 having a card reader 20. The portable electronic device may be any portable electronic device such as, e.g., a mobile radio terminal, a mobile telephone, a cellular telephone, a pager, a communicator, a smart phone, a Personal Digital Assistant (PDA), an electronic organizer, a computer, a digital audio player such as a MP3-player or an iPod®, or a tablet/media plate (e.g., iPad®) a digital camera, an electronic picture frame, a television receiver, a Home cinema, or any other suitable picture or movie projector.

Figure 1:
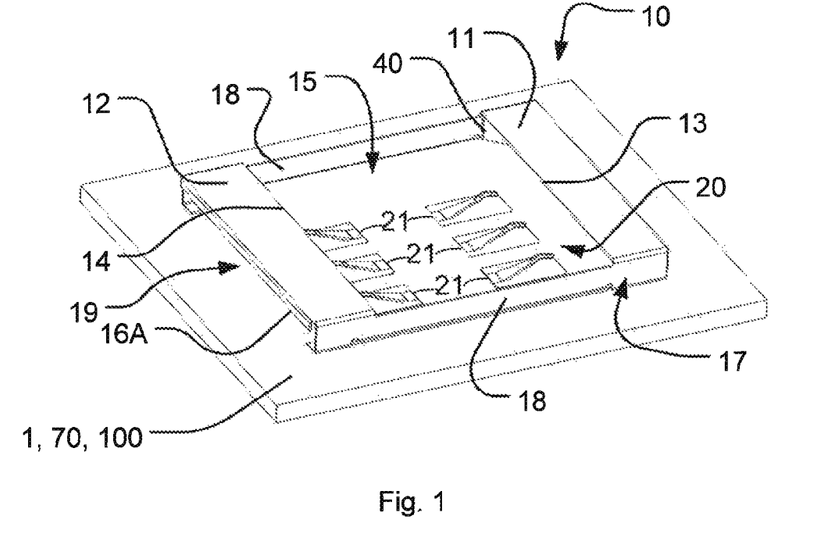
FIG. 1 shows a part of a portable electronic device according to the invention with its integrated card holding device without a smart card.

The card holding device 10 comprises a quadrangular or quadrilateral shaped frame 17 or preferably a rectangular shaped frame 17 as shown in FIG. 1. The card holding frame 17 may also form a housing being parallelepiped. The smart card 30 can be introduced to or removed from the card holding frame 17. The card holding frame 17 has at least two flanges or rims 18 opposite to each other on the sides of the card holding device 10 working as side fences or railings, which prevent the smart card 30 from moving sideways when introduced into and also when stored in the card holding device 10. The rims 18 are arranged on the sides of the card holding device 10 that are not active when introducing or removing the smart card.

The card holding device 10 may comprise more than four sides and the rims 18 may be bent or angled or have a smaller height compared to the shown ones, both of them not necessarily being dimensioned in the same way. This can be necessary for allowing smart cards 30 to be introduced in the card holding device 10 which are not quadrilateral or which have rounded edges. Smart cards 30 can have a variety of different shapes, e.g. any/some of their edges can be rounded or they can be irregular shaped with many corners or/and curves, e.g. microSD™. On two sides or ends opposite each other of the card holding device 10, a first 11 and a second 12 card holding part are arranged. In FIG. 1, the card holding parts 11 and 12 are shaped as plates or lids to hold the smart card 30 down towards the card reader 20. The card holding parts 11, 12 are similar to roofs or superstructures functioning as covers or roofs over at least parts of the card holding device 10, while, at the same time enabling room or space for the card to be received, removed and accommodated therein. The first 11 and second 12 card holding parts may have several different shapes, such as the plates as shown in FIG. 1, rod shaped bars or anything that will function to hold a smart card 30 down towards the card reader 20. In the embodiment where they are plate shaped, they may have a variety of widths; the first 11 and second 12 card holding parts may have different widths as long as the proportions allow a smart card 30 to be introduced from above of the card holding device 10. On the outmost part of the second card holding part 12 to the left in FIG. 1, there is arranged a protrusion 16A which serves to hold the smart card 30 in place laterally in the card holding device when it has been introduced. The protrusion 16A faces the plane of the card reader 20; i.e. it extends or is arranged in the vertical direction as seen from the card holding device 10 with a free end facing towards the card reader 20, i.e., the plane of the card reader. The protrusion 16A may be arranged at only the frame 17, more specifically only at the end of the rims 18, thus being independent from the second card holding part 12, but be integrated or a separate member attached to the second card holding part 12.

On the outmost part of the first card holding part 11 to the right in FIG. 1 there is arranged a second protrusion 16B similar to the first protrusion 16 A, which second protrusion 16B also serves to hold the smart card 30 in place laterally in the card holding device when it has been introduced. The protrusion 16B also faces the plane of the card reader 20; i.e., it extends or is arranged in the vertical direction as seen from the card holding device 10 with a free end facing towards the card reader, i.e., the plane of the card reader. The protrusion 16B may be arranged at only the frame 17, more specifically only at the end of the rims 18, thus being independent from the first card holding part 11, but be integrated or a separate member attached to the first card holding part 11. In some embodiments, the protrusion 16B extends all the way down to a printed circuit/wiring board 70 of the electronic device 1, 100, on which circuit board the card reader is mounted.

The main difference between the two protrusions 16A and 16B of the card holding device 10 is that the first protrusion 16A must be adapted in length or extension so that it enables the card 30 to be moved past or below it during insertion and removal through an opening or gap or slit or clearance 19 in the side or end of the card holding frame 17, i.e., more specifically in the second card holding part 12 of the card reader 20. However, the card holding device 10 could be mirrored so that this clearance 19 was arranged in the first card holding part 11.

In FIGS. 7, 8, 9, 10 and 11 a card reader cut away 22 is shown. The card reader cut away 22 is a part of the card reader that has been removed or cut away, or the card reader 20 was manufactured shorter than the card holding device 10. The card reader 20 is shorter at the side of the second card holding part 12 than the whole card holding device 10 or the frame 17 to enable the insertion and removal of the smart card 30. When the smart card 30 is inserted and/or removed, it is moved in an angle to enable it to move under the second card holding part 12 and under the protrusion at the second card holding part 16A while at the same time being moved over the first card holding part 11. When the smart card 30 is moved in an angle the smart card 30 can move under the protrusion 16A because of the card reader cut away 22. The length X that the card reader cut away 22 is shorter than the card holding device 10 is shown in FIGS. 7, 8, 9, 10 and 11. The length X is adjusted to enable the smart card 30 to move under the protrusion at the second card holding part 16A and depends on the length of the protrusion 16A, the height of the card gap/clearance 19 Z, also shown in FIGS. 7, 8, 9, 10 and 11, the length of the card accessible opening 15 and the length of the smart card 30.

The card reader 20 in FIG. 1 comprises spring terminals 21 which are used to read the smart card 30 and to push the smart card upwards from the card reader 20 towards the first 11 and second 12 card holding parts when the smart card 30 is introduced in the card holding device 10. The spring performance of the spring terminals 21 is also used when removing the card from the card holding device 10: when the smart card 30 has been moved laterally from its inserted position (see FIGS. 6, 11, 13, and 15) to a position where the smart card is no longer under the first card holding part 11, i.e., when the smart card has passed the first edge 13 of the first card holding part (see FIGS. 5 and 10), the spring terminals 21 push the smart card 30 upwards/vertically from the card reader 20 so that one end of the smart card rises above the first card holding part 11. The smart card 30 is then moved in the opposite direction to move the smart card out from under the second card holding part 12 and its protrusion 16A, past the second edge 14 of the second card holding part. When the smart card 30 is no longer under the second card holder part 12 the spring terminals 21 push the smart card up from the card reader 20 and the side of the second card holding part as well and the smart card 30 can be removed from the card holding device 10.

In FIGS. 1, 12, 13 and 14, a chamfer/wedge 40 is preferably arranged at the inside of one corner of the frame 17. The chamfer/wedge 40 is preferably arranged at least partly under the first card holding part 11, but could of course be placed under the second card holding part 12 if the card holding frame 17 was mirrored. The purpose of the chamfer/wedge 40 is to have a keying feature to prevent mis-insertion of the smart card 30; the shape of the chamfer 40 has a corresponding chamfer 31 in the smart card 30 so that it is only possible to insert the smart card in one correct way. The chamfer may be arranged anywhere at the side of the inside of the frame 17 which is at the first card holding part 11. The chamfer/wedge can be arranged anywhere along that side and have any shape that has a corresponding chamfer on the smart card 30 to provide the locking feature. The first card holding part 11, the second 12 card holding part, the rims 18, the protrusions 16A and 16B, the chamfer/wedge 40 and the springs terminals 21 all contribute to holding the smart card 30 in position to be read by the card reader 20 when the smart card is introduced in the card holding device 10. The first card holding part 11 and the second card holding part 12 prevent the smart card 30 from moving in the vertical direction from the card reader 20 due to their extension in parallel with the plane of the card reader towards each other. The rims 18, the chamfer/wedge 40 and the protrusions 16A, 16B prevent the smart card 30 from moving laterally over the card reader 20. The spring terminals 21 make sure that the smart card 30 is held up towards the first 11 and the second 12 card holding parts so that the smart card cannot move under the first protrusion 16A of the second card holding part 12 when read. The rims 18 and the protrusion 16B have a length or extension that is sufficiently longer than the protrusion 16A to be able to hold the card 30 in place laterally even without any biasing effect of the spring terminals 21 upwards from the card reader 20.

Figure 12:
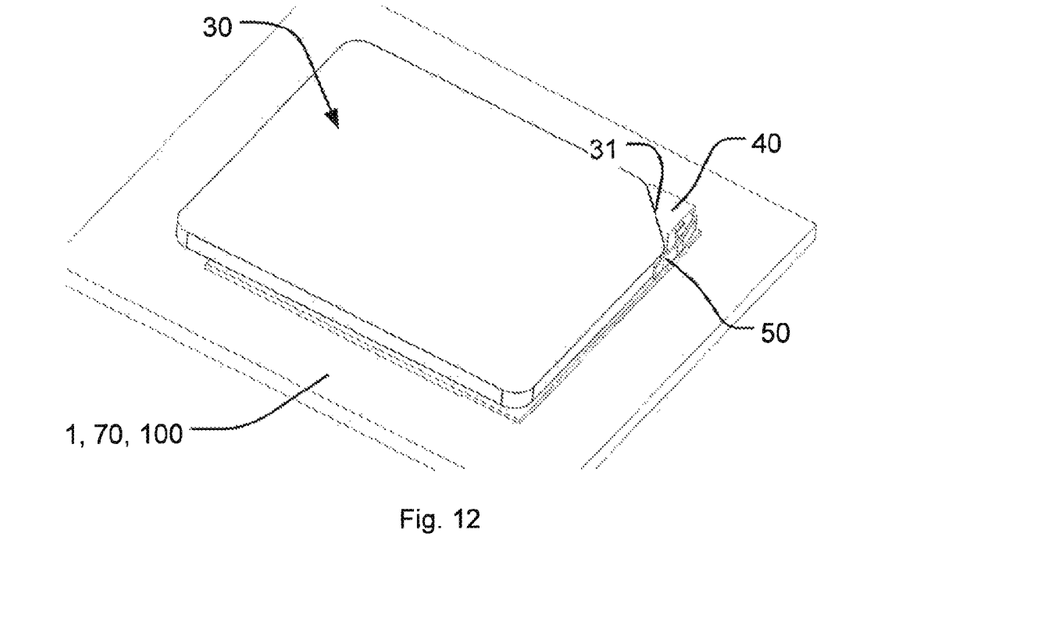
FIG. 12 shows another perspective view of the card holding device shown in FIG. 6 from a different angle in the corresponding final card position but with more parts of the card holding device cut away to show more of the interior and the specific positioning of the card against a detection switch of the card reader in comparison to the cut away views of FIGS. 7 to 11.
Figure 13:
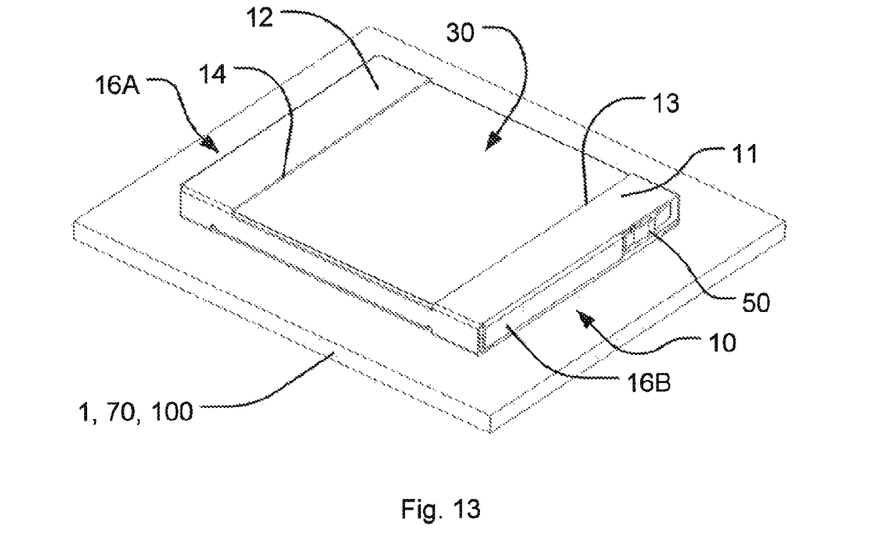
FIG. 13 shows still another perspective view of the card holding device shown in FIGS. 6 and 12 from another angle in the corresponding final card position with no parts of the card holding device cut away to show the specific position of the detection switch.
Figure 14:
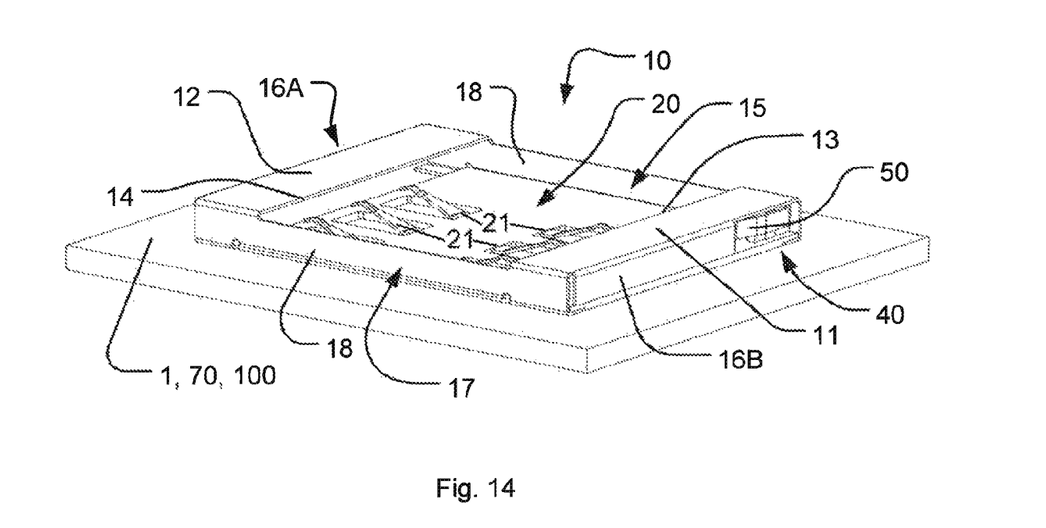
FIG. 14 shows yet another perspective view of the card holding device shown in FIG. 1 from another angle with no card and no parts of the card holding device cut away to show the specific position of the detection switch.
Figure 15:
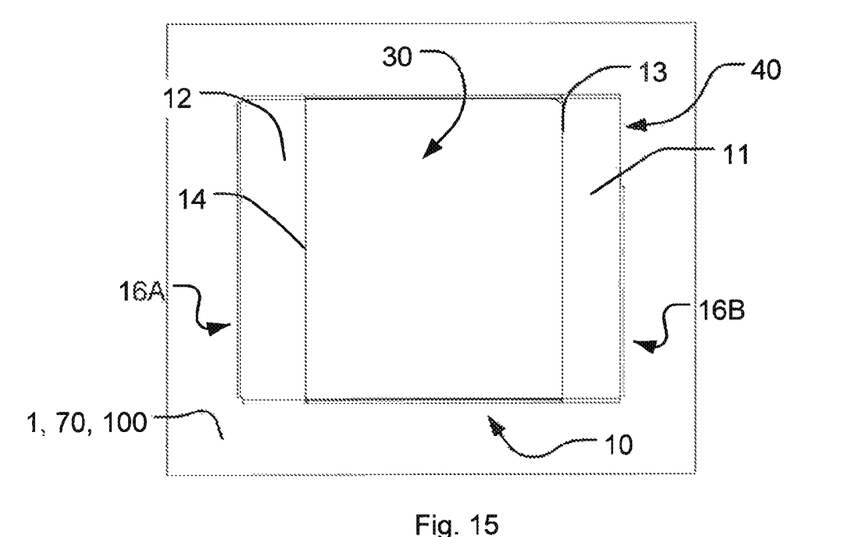
FIG. 15 shows a plane view from above of the card holding device shown in FIGS. 6, 11, 12, and 13 with the smart card in the start or final card position depending on if the introduction of the card is finalized or the removal of it not yet started, i.e. when the card is in its reading position.

A card detection switch 50 is arranged adjacent to the chamfer 40 of the card holding device 10, as illustrated in FIGS. 12, 13 and 14. The card detection switch 50 detects if there is a smart card in the inserted position in the card holding device 10. A card detection switch 50 may be placed anywhere on the inside of the card holding device as long as it is pressed or/and switched when a smart card 30 is in its inserted position. The card detection switch 50 is preferably arranged adjacent to the chamfer 40 to minimize the footprint area but it can also be placed anywhere on the inside of the rims 18, the protrusion 16B, in the frame 17 or on the card reader 20.

Figure 5:
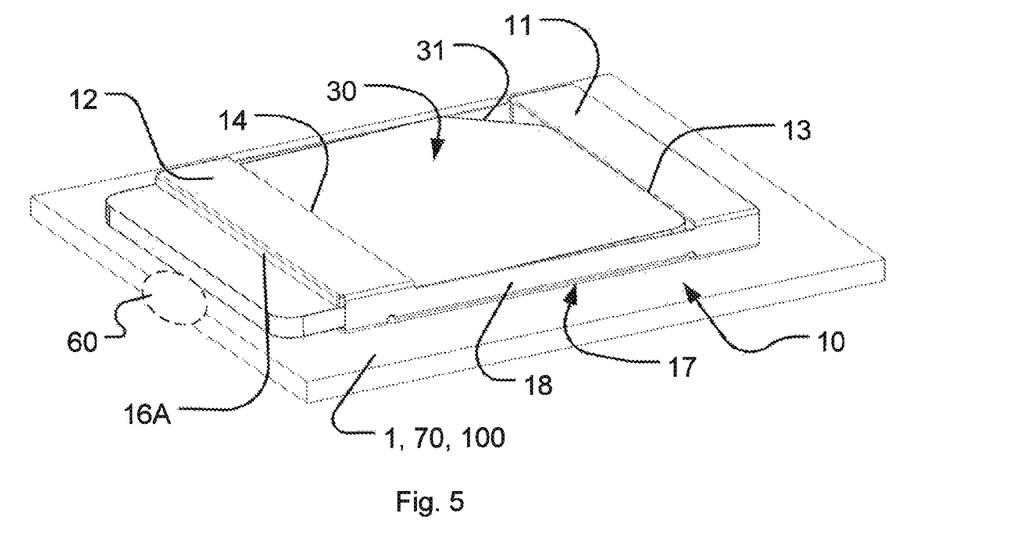
FIG. 5 shows yet another perspective view of the card holding device shown in FIGS. 1 to 4 during insertion or removal of the smart card in another card position before or after the card position shown in FIG. 4.
Figure 6:
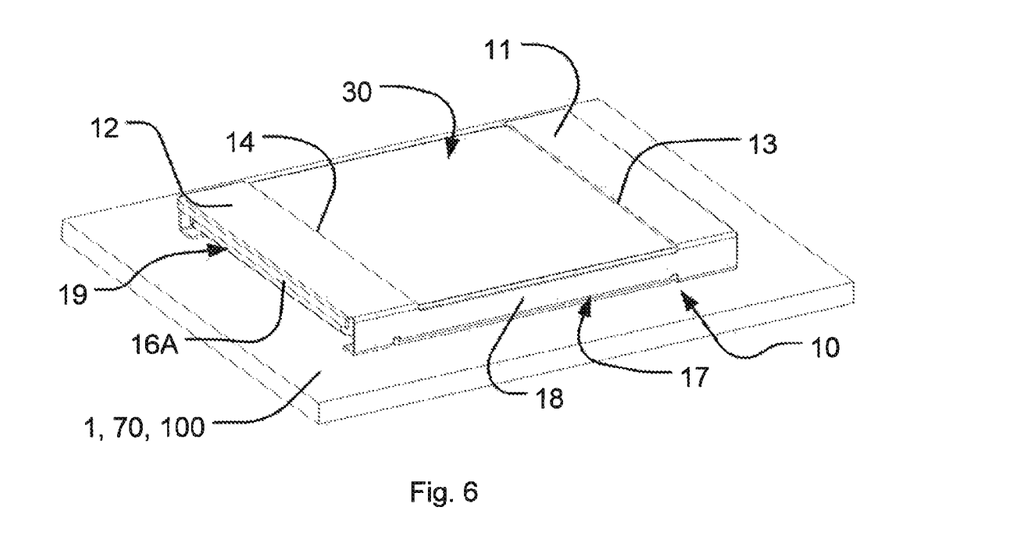
FIG. 6 shows still another perspective view of the card holding device shown in FIGS. 1 to 5 with the smart card in a start or final position, i.e., before removal or after final introduction.
Figure 9:
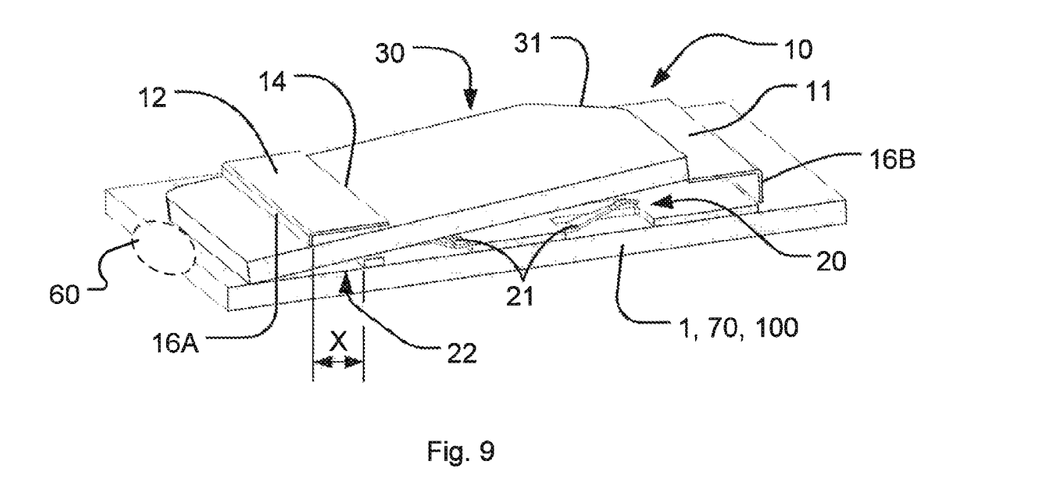
FIGS. 9, 10 and 11 shows other perspective views of the card holding device shown in FIGS. 4, 5 and 6, respectively, from different angles in corresponding momentary card positions as in FIGS. 4, 5 and 6, but with a part of the card holding device cut away in FIGS. 9, 10 and 11.
Figure 10:
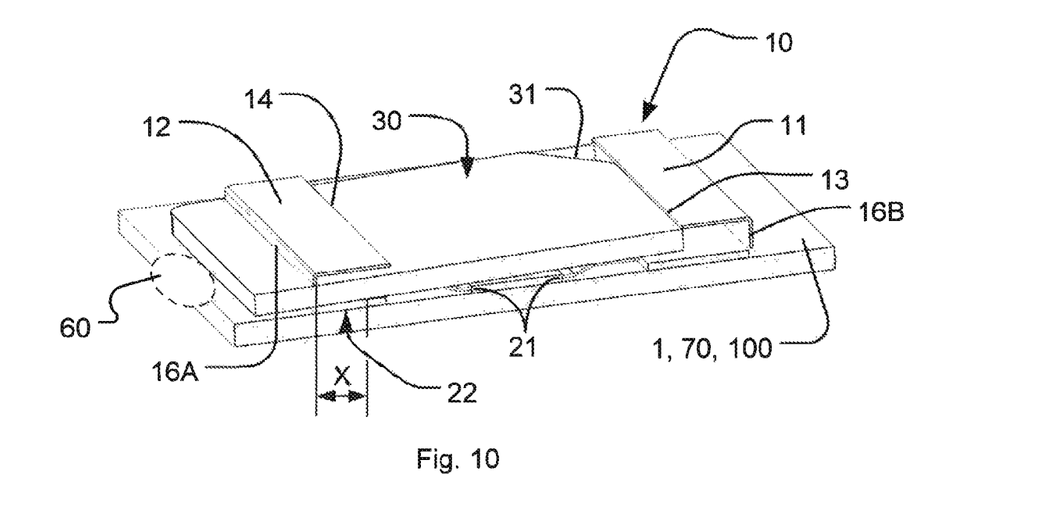
Figure 11:
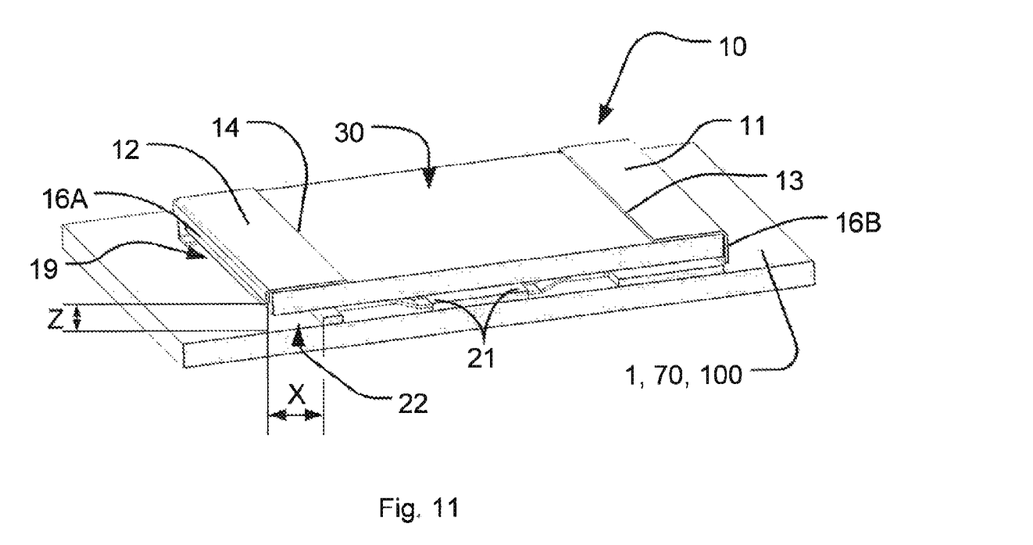

In one embodiment of the invention, a card stopping protrusion 60 is arranged with a vertical extension from the plane of the card holding device 10 at a lateral distance from the card holding device 10 measured from and in parallel with the card reader plane and so that when the smart card 30 is introduced or removed it cannot be pushed too far out under the first protrusion 16A through the clearance 19 (the card stopping protrusion 60 is shown with dotted lines in FIGS. 5, 9, and 10).

Figure 2:
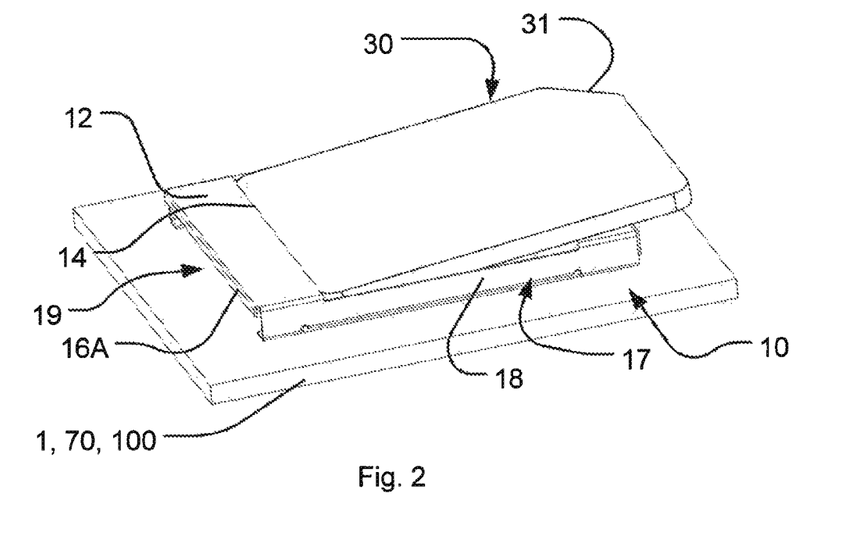
FIG. 2 shows an early stage of the introduction of a smart card into the card holding device or a late stage in removal of the smart card from the card holding device in FIG. 1.
Figure 3:
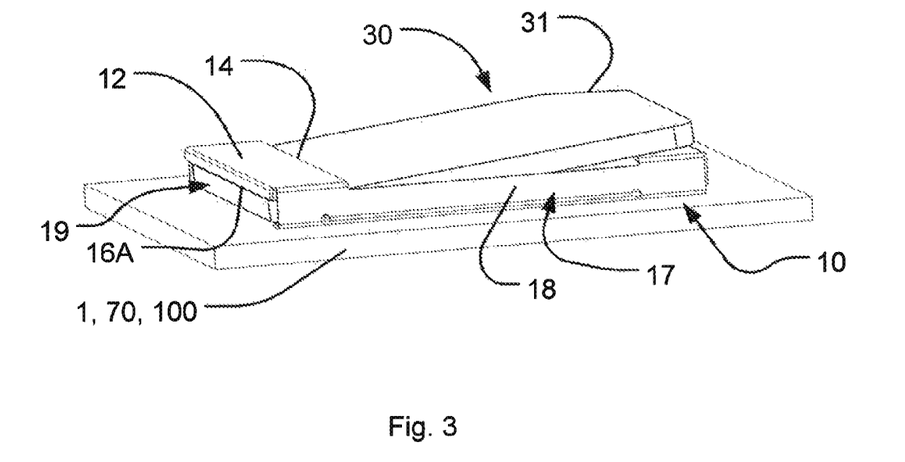
FIG. 3 shows a perspective view of a part of the portable electronic device shown in FIGS. 1 and 2 with its integrated card holding device during the insertion or removal of the smart card before or after the card position shown in FIG. 2.
Figure 4:
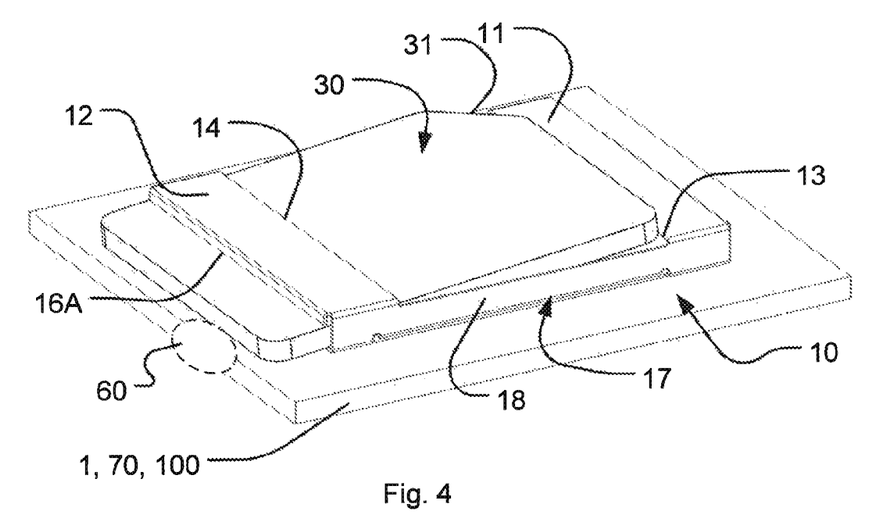
FIG. 4 shows another perspective view from another angle in relation to FIG. 3 of the card holding device during insertion or removal of the smart card before or after the card position shown in FIG. 3.
Figure 7:
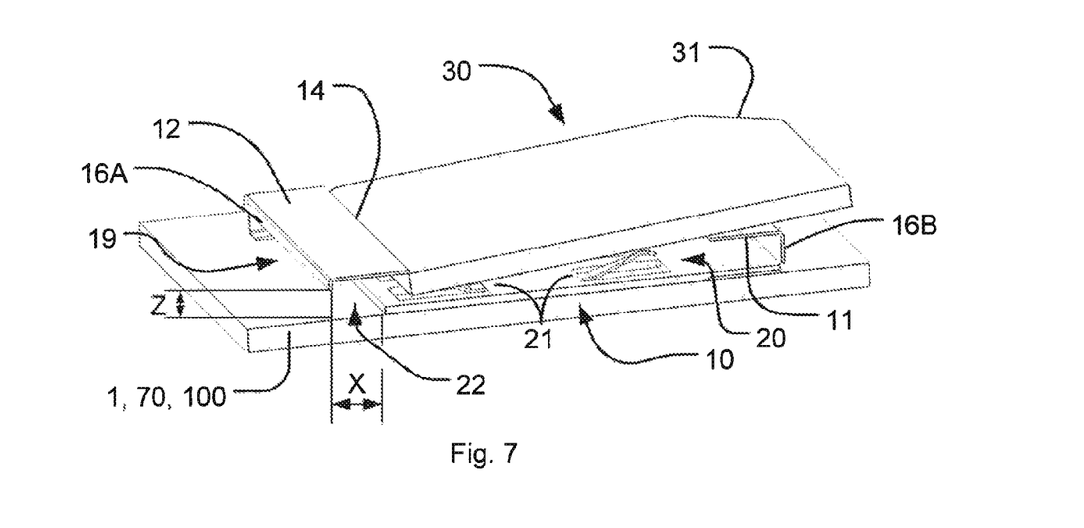
FIGS. 7 and 8 show yet other perspective views of the card holding device shown in FIGS. 2 and 3, respectively, from different angles in corresponding momentary card positions as in FIGS. 2 and 3, but with a part of the card holding device cut away in FIGS. 7 and 8.
Figure 8:
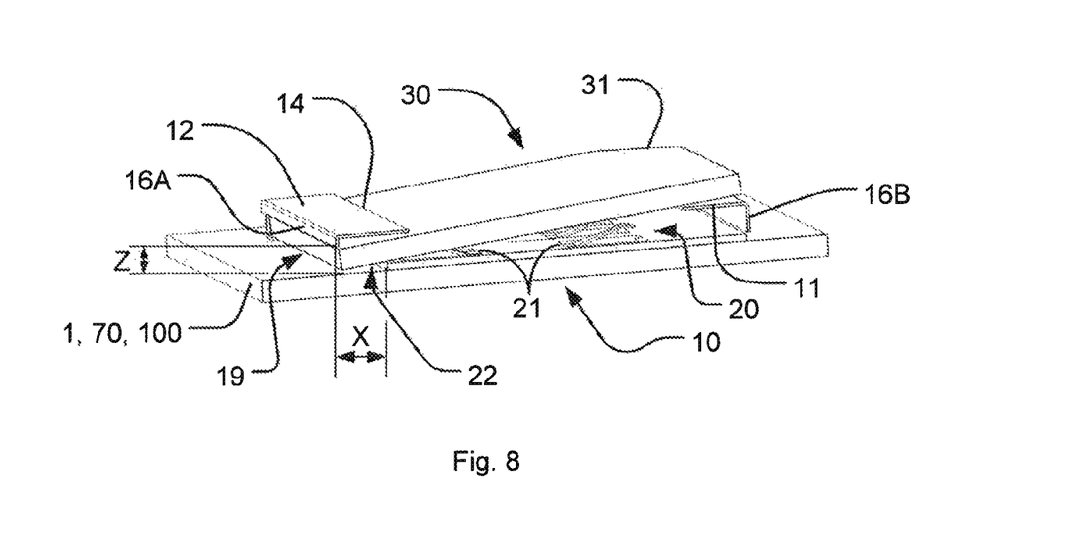

The starting position and the ending position when introducing and removing, respectively, a smart card 30 into and from the card holding device 10 is shown in FIGS. 2 and 7. The smart card 30 is put towards the card reader 20 into abutment or close to the end of the second card holding part 12 facing the first card holding part 11 and on top of the first card holding part 11 on the opposite side. When inserting the smart card 30 into the card holding device 10, the smart card 30 is first placed as shown in FIGS. 2 and 7, then it is moved in a lateral direction which is angled to enable the smart card 30 to slide under the second card holding part 12 while still being positioned on top of the first card holding part 11. This is shown in FIGS. 3 and 8 where one of the rims 18 (the one closest to the viewer of the drawing) has been removed to better illustrate the angled movement of the smart card 30. The angle of the smart card 30 makes it possible to move the smart card in under the protrusion 16A at the second card holding part.

The card reader 20 or electronic device 1 may be provided with an openable and/or a movable lid (not shown) for access of the smart card and/or card holding device 10 inside the electronic device 1. The card reader 20 may comprise an integrated card eject mechanism (not shown) being adapted for enabling easy ejection of a smart card 30 from the card reader. The function of the card reader 20 and such a card eject mechanism are known technology and will not be explained in more detail. The lid may have the function of closing and opening the electronic device 1 and/or the card reader 20 in a known way, and this function will also not be explained in more detail to be able to introduce/load or to remove the smart card 30 in the inventive way as disclosed in this description. Moreover, the card reader may be placed on one long side edge of the electronic device 1. The card reader may of course also be arranged at any other suitable location on and/or in the electronic device as long as easy access to the card reader through the lid and the lid itself for opening and closing is enabled. Alternatively, the card reader may be arranged on the opposite long side edge. The card reader may as an alternative be placed on a short side of the electronic device 1. The card reader may alternatively be placed at the back of the electronic device 1. The card reader may also be placed at the front of the electronic device. The same locations can be considered suitable for the protrusions 16A, 16B, the rims 18 and the card clearance 19 in relation to the short sides and long sides of the card holding device 10.

In this form, the card holding parts 11 and 12 of the card holding device 10 may be somewhat bendable but sufficiently stiff such that the card holding device does not deform or bend when the smart card 30 is introduced therein or removed therefrom. The card holding device 10 may be made of a metal, preferably sheet metal being bent into a suitable shape or another material being suitable for this, such as plastic.

As described earlier, the card holding device 10 according to the invention may be intended for the usage together with a portable electronic device 1, such as a the mobile telephone as illustrated in FIG. 1, and has the further advantage that the card holding device makes the available space of the portable electronic device smaller for the card reader 20 and makes the necessary foot-print area for removal and loading of a smart card 30 into and from the card reader, respectively, to be used and function smaller as the smart card 30 is firstly moved in a direction substantially corresponding to the height, i.e., z-axis, of the card reader, the plane of the card reader defining an x-y-plane and then moved in at least one further direction in the plane of the card reader when introducing or removing it from the card reader meaning that the smart card is introduced into or removed from the card reader from above, i.e. in an angle or essentially vertically in relation to the card reader plane, and in alignment with and within the foot-print area of only the card reader requiring much less space/area outside the card reader and in substantially the same x-y-plane as the card reader. Hence, the invention enables the smart card to be "landed" onto or "taken off" from the card reader similar to a helicopter landing on or taking off from a helipad or similar to the Harrier Jump jet being a VTOL (vertical take-off and landing) craft when taking off vertically and then travel horizontally during flight, at least during parts of the movement of the smart card 30.

The card holding device 10 is fixedly attached to the card reader 20.

In the portable electronic device 1, the card 30 is angled and moved in the first direction towards the card reader 20 in an angle in relation to the plane of the card reader past a certain distance corresponding to an abutment formed by the first protrusion 16A in engagement with the card to create a shape grip in the final loaded reading state of the smart card 30 in the card reader 20.

The present invention has been described above with reference to a specific aspect. Many modifications can be made by a person skilled in the art. The aspects described above is merely an illustrative example and the invention can be modified and used together with many different products, not only portable electronic devices as indicated in the detailed description. The different features of the invention can be combined in other combinations than those described. The invention is only limited by the appended claims.

Listed below is an index of elements illustrated in the figures.

1, 100 portable electronic device
10 card holding device
11 first card holding part 12 second card holding part
13 first edge of the first card holding part
14 second edge of the second card holding part
15 card accessible opening
16A first protrusion at the second card holding part
16B second protrusion at the first card holding part
17 card holding frame
18 rims of the card holding frame
19 card gap/clearance
20 card reader
21 spring terminals
22 card reader cut away
30 smart card
31 smart card chamfer
40 chamfer/wedge of the card holding device
50 card detection switch
60 card stopping protrusion
70 printed circuit/wiring board

The invention claimed is:

1. A portable electronic device comprising:
a card reader for introducing and removing a card into and from the card reader in at least two different directions, wherein the card is moved in one direction being angled in relation to the plane of the card reader and moved laterally in another direction in the car reader during introduction and removal of the card; and
a card holding device including first and second card holding parts that hold the card down towards the card reader in an introduced state and a protrusion arranged at the second card holding part facing the plane of the card reader,
wherein during introduction and removal of the card, an end of the card is moved under and past the protrusion and the second part, and
wherein in the introduced state the protrusion serves as a stop to hold the card in place laterally.

2. The portable electronic device of claim 1, wherein, during introduction and removal of the card, the card is moved in the angled direction and the lateral direction, respectively, past and/or under the first and the second parts of the card holding device.

3. The portable electronic device of claim 2, wherein the card holding device has at least two edges, a first edge at the first card holding part and a second edge at the second card holding part, wherein, during introduction and removal of the card, the card is moved in the angled direction and the lateral direction, respectively, past and/or under the edges of the card holding device.

4. The portable electronic device of claim 2, wherein, during introduction and removal of the card, the card is moved in the angled direction above the first part and below the second part of the card holding device.

5. The portable electronic device of claim 4, wherein, during introduction and removal of the card, the card is moved in the lateral direction under the first part and the second part of the card holding device.

6. The portable electronic device of claim 2, wherein, during introduction and removal of the card, the card is moved in the lateral direction under the first part and the second part of the card holding device.

7. The portable electronic device of claim 2, wherein the card holding device is fenestrated enabling the card to be introduced and removed in the vertical direction of the card reader through an opening between the card holding parts, which opening is arranged within a footprint area of the card reader.

8. The portable electronic device of claim 7, wherein the card holding device comprises a wedge achieving a keying feature for preventing misinsertion of the card, wherein the wedge comprises a detection switch for detecting introduction and removal of the card.

9. The portable electronic device of claim 1, wherein the card holding device has at least two edges, a first edge at the first card holding part and a second edge at the second card holding part, wherein, during introduction and removal of the card, the card is moved in the angled direction and the lateral direction, respectively, past and/or under the edges of the card holding device.

10. The portable electronic device of claim 9, wherein, during introduction and removal of the card, the card is moved in the angled direction above the first edge and below the second edge of the card holding device.

11. The portable electronic device of claim 10, wherein, during introduction and removal of the card, the card is moved in the lateral direction under the first edge and the second edge of the card holding device.

12. The portable electronic device of claim 9, wherein, during introduction and removal of the card, the card is moved in the lateral direction under the first edge and the second edge of the card holding device.

13. The portable electronic device of claim 1, wherein the card reader comprises spring terminals, which spring terminals bias the card from the card reader into locking engagement with the card holding device in the introduced state of the card.

14. The portable electronic device of claim 1, wherein the card holding device comprises a wedge achieving a keying feature for preventing misinsertion of the card, wherein the wedge comprises a detection switch for detecting introduction and removal of the card.

15. The portable electronic device of claim 1,
wherein, during introduction and removal of the card, the card is moved in the angled direction and the lateral direction, respectively, past and/or under the first and the second parts of the card holding device, and
wherein the second card holding part comprises a clearance below the protrusion enabling the card to be moved through the clearance in the angled direction and the lateral direction during introduction and removal of the card.

16. The portable electronic device of claim 15,
wherein the card reader is shorter than the card holding device at the first or second card holding part to enable the insertion and removal of the card through the clearance.

17. The portable electronic device of claim 1, wherein the card holding device comprises only non-movable parts.

18. A portable electronic device comprising:
a card holding device including first and second card holding parts each having first and second edges laterally spaced from one another, and a protrusion arranged at the second edge of the second card holding part; and
a card reader for introducing and removing a card into and from the card reader in at least two different directions, wherein during introduction of the card, the card is moved in one direction being angled in relation to a plane of the card reader, and moved laterally in another direction from the first edge of the second card holding part towards the second edge of the second card holding part partly out of the card holding device through a clearance under the protrusion and back into the card holding device.

19. The portable electronic device of claim 18, wherein the first and second card holding parts hold the card down towards the card reader in an introduced state.

20. The portable electronic device of claim 18, wherein during introduction and removal of the card, an end of the card is moved under and past the protrusion and the second edge of the second card holding part.

21. The portable electronic device of claim 18, wherein in the introduced state the protrusion serves as a stop to hold the card in place laterally.

22. The portable electronic device of claim 18, wherein the card holding device comprises only non-movable parts.

\* \* \* \* \*